(12) United States Patent
Oh et al.

(10) Patent No.: US 7,559,963 B2
(45) Date of Patent: Jul. 14, 2009

(54) CYCLONE DUST-COLLECTING DEVICE AND VACUUM CLEANER HAVING THE SAME

(75) Inventors: Jang-keun Oh, Gwangju (KR); Ji-won Seo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 607 days.

(21) Appl. No.: 11/357,885

(22) Filed: Feb. 17, 2006

(65) Prior Publication Data

US 2006/0230715 A1    Oct. 19, 2006

(30) Foreign Application Priority Data

Apr. 18, 2005    (KR) .................. 10-2005-0032075

(51) Int. Cl.
*B01D 45/12*    (2006.01)
(52) U.S. Cl. .................. 55/337; 55/410; 55/447; 55/429; 55/459.1; 55/495; 55/DIG. 3; 15/350; 15/353
(58) Field of Classification Search .............. 55/337, 55/410, 429, 447, 459.1, 495, DIG. 3; 15/350, 15/353
See application file for complete search history.

(56) References Cited

U.S. PATENT DOCUMENTS

| | | | |
|---|---|---|---|
| 6,175,988 B1 | 1/2001 | White et al. ............... | 15/327.1 |
| 6,383,266 B1 * | 5/2002 | Conrad et al. .................. | 96/57 |
| 6,406,505 B1 | 6/2002 | Oh et al. ....................... | 55/337 |
| 6,625,845 B2 * | 9/2003 | Matsumoto et al. ........... | 15/353 |

FOREIGN PATENT DOCUMENTS

| | | |
|---|---|---|
| GB | 2 389 034 | 12/2003 |
| GB | 2397785 | 8/2004 |
| JP | 2004-167205 | 6/2004 |
| KR | 1020030010994 | 2/2003 |

OTHER PUBLICATIONS

Search Report dated Jun. 2, 2008 corresponding to Australian Patent Application No. 2006200983.
Official Action dated Mar. 20, 2006 issued from Korean Intellectual Property Office in regards to Korean Patent Application No. 2005-32075 filed on Apr. 18, 2005.
Combined Search and Examination Report dated Jul. 6, 2006 issued from the British Patent Office with respect to British Patent Application No. 0605266.6 filed on Mar. 15, 2006.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

A vacuum cleaner includes a suction port assembly, a motor generating a suction force at the suction port assembly, and a cyclone dust collecting device for centrifugally separating air drawn in through the suction port assembly and the motor in sequence. The cyclone dust-collecting device includes an air discharge port penetratingly formed on an outer circumference of the cyclone dust-collecting device and exposed to an outside of the cleaner body, for guiding the air discharged to the outside. Accordingly, since the air discharge port is disposed in the cyclone dust collecting device, not in the cleaner body, a discharge channel for connecting the cyclone dust collecting device and cleaner body is omitted and thus a structure of the vacuum cleaner becomes simplified.

17 Claims, 4 Drawing Sheets

CYCLONE DUST-COLLECTING DEVICE AND VACUUM CLEANER HAVING THE SAME

CROSS-REFERENCE TO RELATED APPLICATIONS

This application claims benefit under 35 U.S.C. §119 from Korean Patent Application No. 2005-32075, filed Apr. 18, 2005, the entire content of which is incorporated herein by reference.

BACKGROUND OF THE INVENTION

1. Field of the Invention

The present invention relates to vacuum cleaner, and more particularly, to a cyclone dust-collecting device for separating dirt from drawn-in air and a vacuum cleaner having the same.

2. Description of the Related Art

A vacuum cleaner draws in dirt from a cleaning surface together with an ambient air and separates the dirt from the drawn-in air. A currently developed vacuum cleaner employs a cyclone dust-collecting device which separates dirt from drawn-in air using a centrifugal force.

When the cyclone dust-collecting apparatus collects dirt as much as a predetermined amount, a user dismounts a dirt receptacle from the vacuum cleaner, empties the dirt receptacle and then re-mounts the empty dirt receptacle. Such a cyclone dust-collecting device is advantages over a dust-collecting device using a paper bag for the sanitary reason and provides a convenience to a user.

However, the conventional vacuum cleaner has to comprise not only a suction passage from a dirt suction port to the cyclone dust-collecting device, but also a discharge passage from the cyclone dust-collecting device and an air discharge port of the vacuum cleaner. Due to the presence of the discharge passage, the conventional vacuum cleaner has a complicated structure, and thus, a manufacturing cost increases and many number of manufacturing processes are required. It is not easy to maintain the vacuum cleaner in good condition or repair the vacuum cleaner.

SUMMARY OF THE INVENTION

The present invention has been developed in order to solve the above problems in the related art. Accordingly, an aspect of the present invention is to provide a cyclone dust-collecting device having a simplified and improved structure and a vacuum cleaner having the same.

The above and other aspects are achieved by providing a vacuum cleaner comprising: a dust suction port disposed at a lower end of a cleaner body to face a cleaning surface; a cyclone dust-collecting device having a cyclone chamber to centrifugally separate the air drawn in through the dust suction opening; a motor disposed in an air channel between the cyclone dust collecting device and the dust suction port to draw in dust-entrained air from the cleaning surface through the dust suction port and also to forcedly move the drawn-in air towards the cyclone chamber; and an air discharge port penetratingly formed on an outer circumference of the cyclone dust-collecting device and exposed to an outside of the cleaner body, and the drawn-in air passes by the cyclone chamber and then is discharged to the outside of the cleaner body through the discharge opening.

Since the air discharge port is disposed in the cyclone dust collecting device, not in the cleaner body, a discharge channel for connecting the cyclone dust collecting device and cleaner body is omitted and thus a structure of the vacuum cleaner becomes simplified.

According to an exemplary embodiment, the cyclone dust-collecting device comprises a discharge cover pivoting between a first position and a second position, the first position to open the air discharge port, the second position to cover the air discharge port, and the discharge cover is pivoted to the first position by the air discharged through the air discharge port and pivoted back to the second position by a self-weight.

Preferably, but not necessarily, the discharge cover comprises a protrusion protruding therefrom, the protrusion contacting an inside edge of the air discharge port when the discharge cover is pivoted to the first position by the discharged air and thereby restricting a pivotal movement of the discharge cover, and the first position is set to an allowable position such that the discharge cover is recovered to the second position by the self-weight when the motor is not driven.

Preferably, but not necessarily, the cyclone dust-collecting device comprises a cyclone head disposed in the cleaner body and having an opened upper end fluidly communicating with an outlet of the cyclone chamber, and cover pivotably disposed at an open upper end of the cyclone body and opening and closing the upper end of the cyclone head, and the air discharge port and the discharge cover are disposed on the cover.

Accordingly, the air is prevented from being discharged towards a user or a cleaner surface. Therefore, dust on the cleaner surface are prevented from being scattered due to the air discharged from the vacuum cleaner and a cleaning efficiency can be maintained. Also, users do not feel unpleasant when using the vacuum cleaner. Also, the discharge cover prevents dirt from flowing into the cyclone dust collecting device through the air discharge port.

Preferably, but not necessarily, the discharge cover is inclined such that a free end of the discharge cover is positioned under a pivotal axis of the discharge cover when the discharge cover is positioned at the second position. Accordingly, the discharge cover is prevented from pivoting to open the air discharge port when the motor is not driven.

Preferably, but not necessarily, the cyclone dust-collecting device comprises a filter chamber disposed in an air passage connecting an outlet of the cyclone chamber and the air discharge port, an upper end of the filter chamber being opened and closed by the cover; a cylindrical filter case removably mounted in the filter chamber and having an upper wall; and a filter member disposed inside the filter case, and the filter case comprises a plurality of perforations formed on the upper wall of the filter case, for guiding the air passing through the filter member toward the air discharge port, and a holding recess disposed on the upper wall of the filter case away from the perforations, the holding recess enabling a user to insert his/her fingers thereto to hold the filter case.

Preferably, but not necessarily, a lower end of the cover and an upper end of the cyclone head, which contact each other when the cover is closed, downwardly incline away from a pivotal axis of the cover.

Preferably, but not necessarily, the cyclone dust-collecting device comprises: a locking device having connection members respectively provided on the cover and the cyclone head, the connection members being selectively engaged with each other when the cover is closed; and an elastic member to elastically pressing the cover to open the cyclone head when the locking device is unlocked.

Preferably, but not necessarily, the cyclone dust-collecting device comprises a guide member disposed at the cyclone head to cover a downstream portion of the inlet along the air suction passage, the guide member guiding the air drawn into the cyclone chamber through the inlet in a tangential direction with respect to an inner circumference of the cyclone chamber.

Preferably, but not necessarily, the cyclone dust-collecting device comprises a partition covering the upper portion of the cyclone chamber, and the guide member has a curved portion formed by curving a part of the partition upwardly. The curved portion downwardly inclines along an advancing direction of the drawn-in air.

According to another exemplary embodiment of the present invention, a cyclone dust-collecting device comprises a cyclone head disposed in a cleaner body to connect with a suction pipe, air drawn in from a cleaning surface through a dirt suction port of the cleaner body flowing into the cyclone head through the suction pipe; a dirt receptacle removably connected with the cyclone head and thereby forming a cyclone chamber to centrifugally separate the air drawn in through the suction pipe; an air discharge port penetratingly formed through an outer circumference of the cyclone head exposed to the outside of the cleaner body to discharge the air discharged from the cyclone chamber to the outside; and a discharge cover pivoting between a first position to open the air discharge port and a second position to close the air discharge port, wherein the discharge cover is pivoted to the first position by the air discharged from the air discharge port when the motor is driven.

BRIEF DESCRIPTION OF THE DRAWINGS

These and/or other aspects of the present invention will become apparent and more readily appreciated from the following description of the embodiment, taken in conjunction with the accompanying drawings of which.

DETAILED DESCRIPTION OF AN EXEMPLARY EMBODIMENT

Hereinafter, the present invention will now be described in greater detail with reference to the accompanying drawings.

Figure 1:
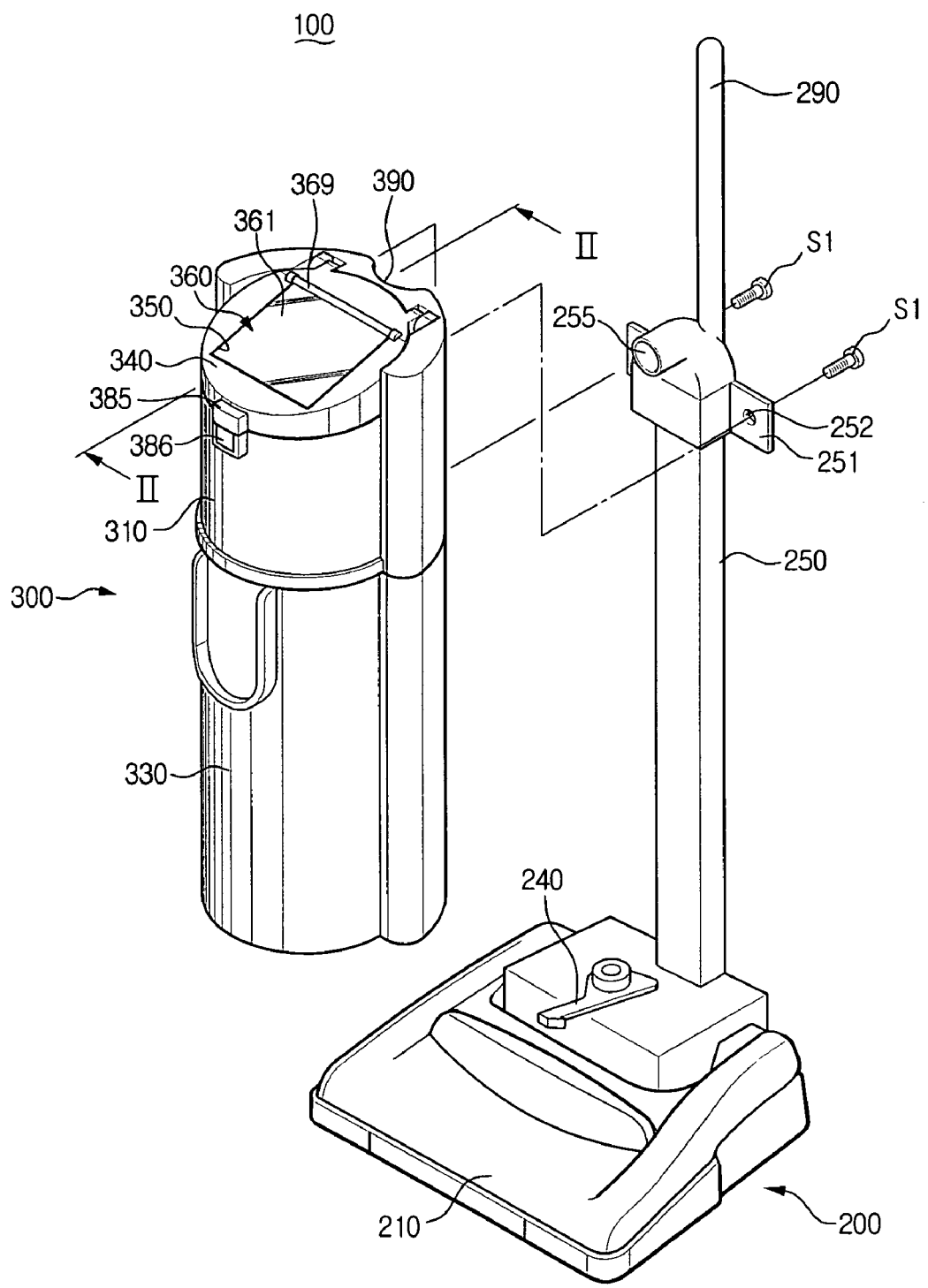
FIG. 1 is an exploded perspective view illustrating a vacuum cleaner according to an embodiment of the present invention.
Figure 2:
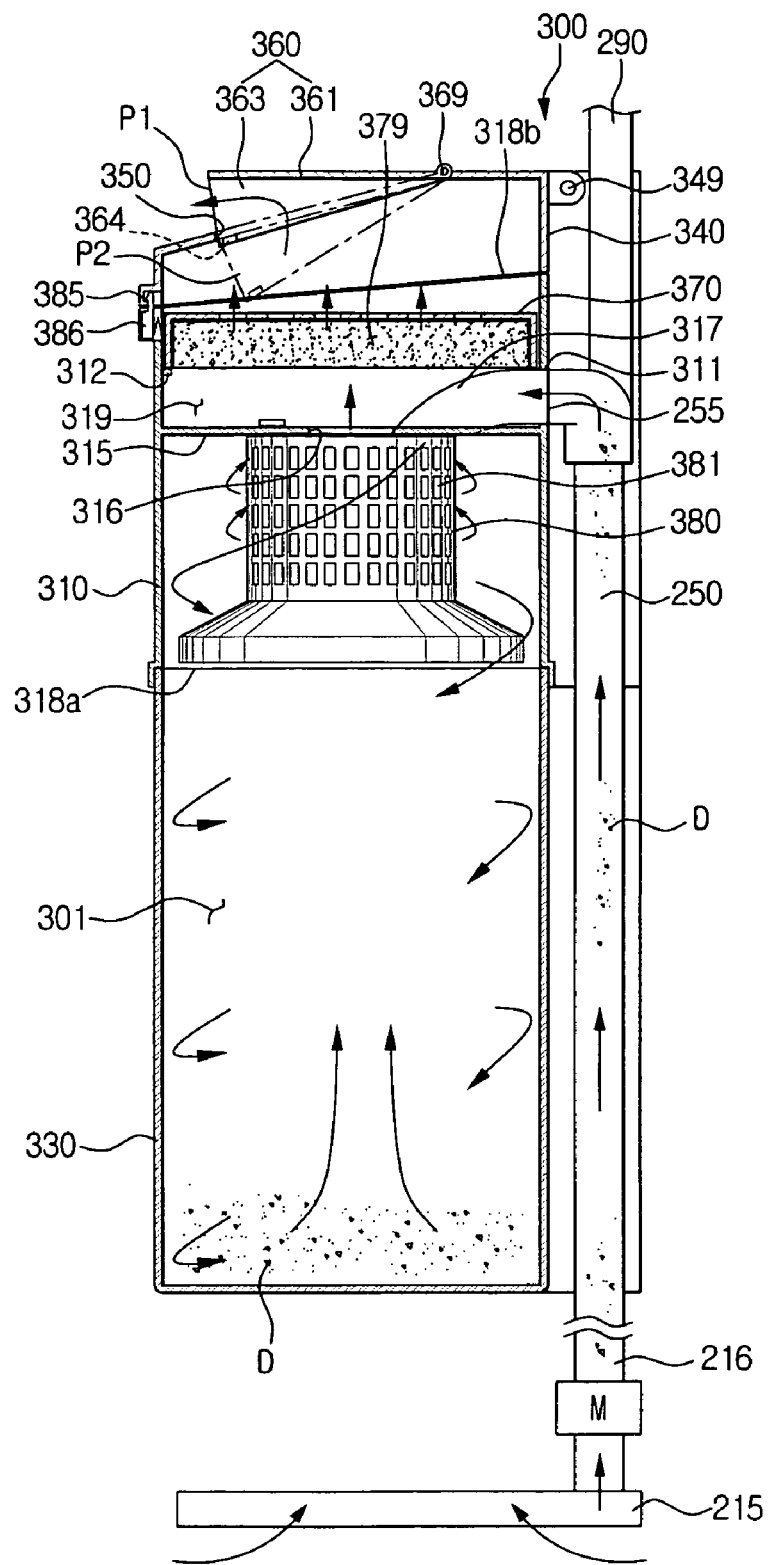
FIG. 2 is a view illustrating the vacuum cleaner being operated, taken along line II-II of FIG. 1.

FIGS. 1 and 2 show one example of a vacuum cleaner according to an embodiment of the present invention. Referring to FIGS. 1 and 2, a vacuum cleaner 100 according to an embodiment of the present invention comprises a cleaner body 200 and a cyclone dust-collecting device 300.

The cleaner body 200 comprises a suction port assembly 210 having a dirt suction port 215 formed on a bottom thereof, a suction motor M generating a suction force at the dirt suction port 215, a suction pipe 250 and a handle 290. In this embodiment, the suction motor M is disposed at a channel 216 connecting the dirt suction port 215 and the suction pipe 250 and is a bypass motor. When the suction motor M is driven, dirt D (see FIG. 2) is drawn in from a cleaning surface through the dirt suction port 215 together with an ambient air, passes through the suction motor M and then is forcedly flowed into the suction pipe 250. The dirt (D)-laden air is guided to the cyclone dust-collecting device 300 through the suction pipe 250.

Figure 3:
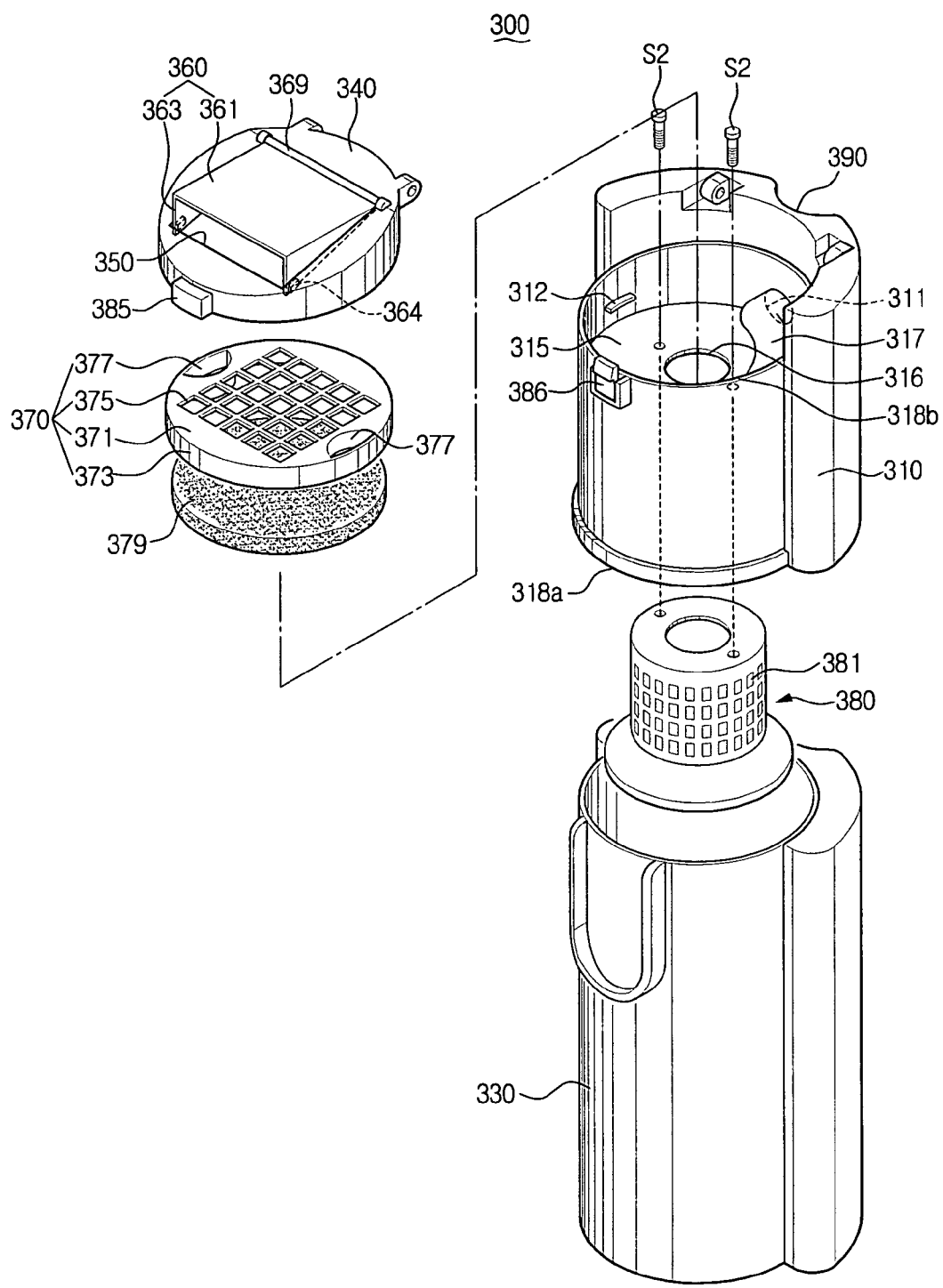
FIG. 3 is an exploded perspective view illustrating the cyclone dust-collecting device of FIG. 1.

The cyclone dust-collecting device 300 centrifugally separates the dirt D from the air drawn in through the suction pipe 250. FIG. 3 is a view illustrating the cyclone dust-collecting device 300 according to an embodiment of the present invention. Referring to FIGS. 2 and 3, the cyclone dust-collecting device 300 comprises a cyclone head 310, a dirt receptacle 330 and a cover 340. The cyclone dust-collecting device 300 further comprises a receiving recess 390 for receiving a part of the suction pipe 250 and a part of the handle 290 which face the cyclone dust-collecting device 300 when the cyclone dust-collecting device 300 is mounted in the cleaner body 200. The dirt receptacle 330 is removably connected with an open lower end 318a of the cyclone head 310 and has a cyclone chamber 301 in which the drawn-in air is centrifugally separated. The dirt receptacle 330 is connected with the cyclone head 310 in various methods. In this embodiment, an auxiliary connection device such as a mounting lever 240 (see FIG. 1) is provided on the cleaner body 200. The mounting lever 240 ascends the dirt receptacle 330, thereby connecting the dirt receptacle 330 with the cyclone head 310.

The cyclone head 310 comprises an cylindrical inner space 319 having an open upper end 318b and the open lower end 318a, an inlet 311, an outlet 316 and a partition 315. The inlet 311 fluidly communicates with an outlet 255 (see FIG. 1) of the suction pipe 250 when the cyclone head 310 is secured to the suction pipe 250. The cyclone head 310 is secured to the cleaner body 200 in various methods. In this embodiment, a first screw S1 is driven in the cyclone head 310 through a first securing hole 252 formed on a securing piece 251 of the suction pipe 250 such that the cyclone head 310 is secured to the cleaner body 200. The partition 315 is disposed inside the cyclone head 310 to divide the inner space 301 into an upper space 319 and a lower space. A grill assembly 380 is secured to a lower surface of the partition 315 by a second screw S2. The grill assembly 380 has a plurality of perforations 381 formed on an outer circumference. The grill assembly 380 filters air that is discharged through the outlet 316 after being separated from the dirt in the cyclone chamber 301 as shown in FIG. 2.

Figure 4:
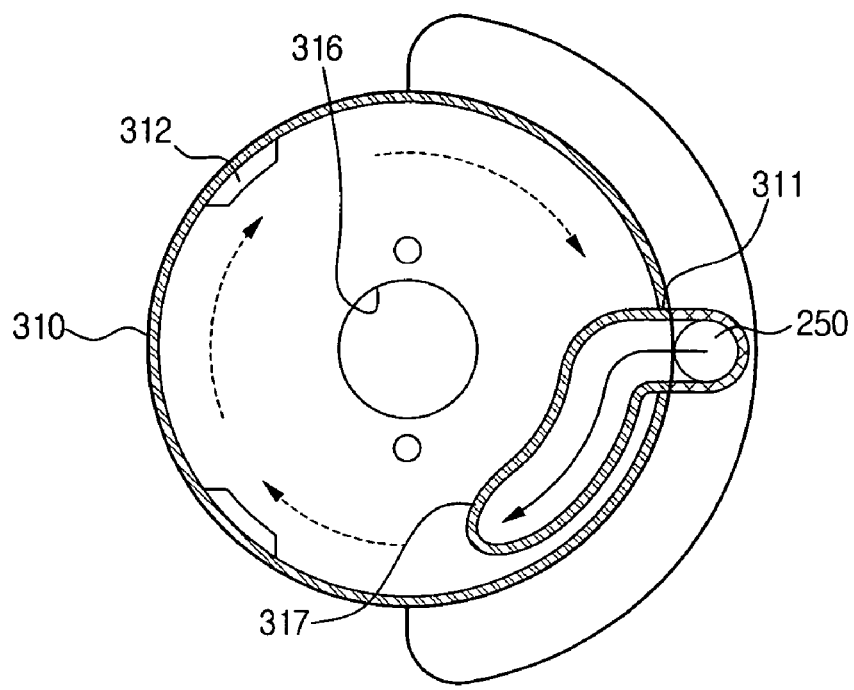
FIG. 4 is a top section view illustrating the cyclone head of FIG. 3.

According to an embodiment of the present invention, the cyclone dust-collecting device 300 further comprises a guide member for guiding the air drawn in the cyclone dust-collecting device 300 through the inlet 311 in a tangential direction with respect to an inner circumference of the cyclone chamber 301. Due to the presence of the guide member, the air swirls along the inner circumference of the cyclone chamber 301 and thereby increases a centrifugal force and improves a dirt separation efficiency of the cyclone dust-collecting device 300. As shown in FIGS. 2 to 4, the guide member includes a curved portion 317 which covers a downstream portion of the inlet 311 along an advancing direction of the air. The curved portion 317 corresponds to an upper end of the inlet 311 which is located higher than the partition 315 and downwardly inclines from the inlet 311 toward the bottom of the cyclone chamber 301. Accordingly, the air downwardly inclines and swirls along the inner circumference of the cyclone chamber 301. The curved portion 317 is formed by upwardly curving a part of the partition 315 adjacent to the inlet 311, which is prevent the dust-collecting device 300 from being complicated due to the presence of a guide member. Due to the presence of the guide member, the air flowing into the cyclone chamber 301 is subjected to a constant centrifugal force regardless of the shape of the inlet 311 and a connecting position of the inlet 311 and the suction pipe 250. Accordingly, as shown in FIG. 4, the suction pipe 250 is connectible with the inlet 311 in a perpendicular direction to the inner circumference of the cyclone head 310 such that the air, drawn in through the inlet 311 of the cyclone head 310, is guided toward the center of the cyclone chamber 301. A conventional cyclone dust-collecting device has a curved suction pipe to increase a swirling force of drawn-in air in a cyclone chamber, or has a suction pipe which is connected to an inlet with an angle with respect to an inner circumference of the cyclone dust-collecting device. Compared to the conventional dust-collecting device, a connection position of the suction pipe 250 and the cyclone head 310 is more flexible.

The filter chamber 319 is formed in an upper portion of the partition 315 of the cyclone head 310. The filter chamber 319 finally filters the air discharged from the cyclone dust-collecting device 300, thereby discharging the air in a purer condition. The filter chamber 319 is opened and closed by the cover 340 pivotably disposed at the cyclone head 310. A filter member 379 and a filter case 370 for finally filtering the air are mounted in the filter chamber 319. The filter case 370 has an upper wall 371 and a sidewall 373. The filter member 379 is removably mounted in the filter case 370 formed by the upper wall 371 and the sidewall 373. The filter case 370 is removably mounted on the upper portion the partition 315, and supported by a support protrusion 312 protruding from the inner circumference of the cyclone head 310 and positioned higher than the partition 315. The upper wall 371 of the filter case 370 comprises a plurality of perforations 375 for discharging the air exiting from the filter member 379 therethrough and a holding recess 377 disposed away from the perforations 375 and having the shape for a user to insert his/her fingers to hold the filter case 370. Due to the presence of the holding recess 377, a user easily mounts or dismounts the filter case 370 on or from the filter chamber 319 through the open upper end 318b of the cyclone head 310.

Figure 5:
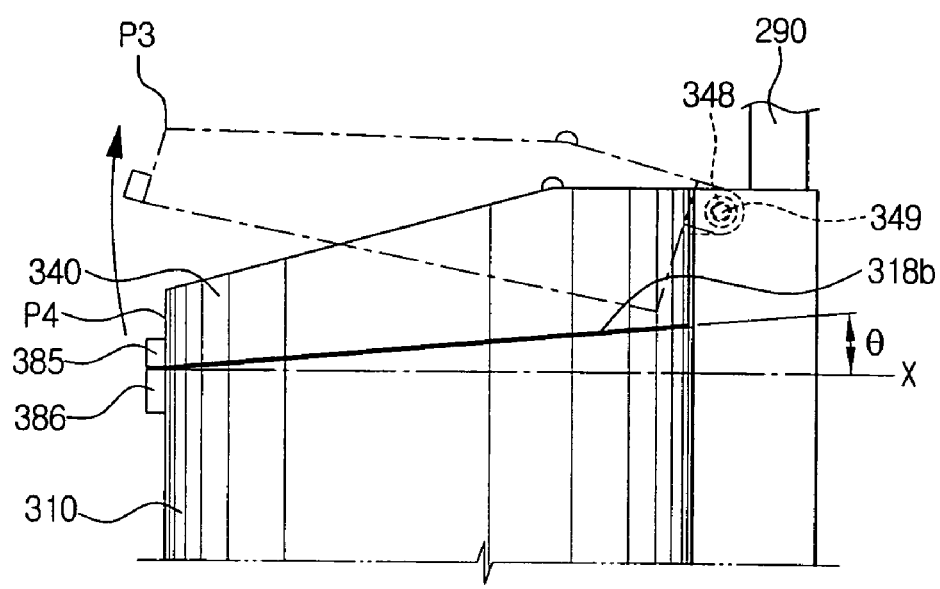
FIG. 5 is a side view illustrating a cover which is opened and closed according to an embodiment of the present invention.

The filter chamber 319 is opened and closed by the cover 340. For this, as shown in FIG. 5, the cover 340 pivots on a pivotal axis 349 between a third position P3 to open the filter chamber 319 and a fourth position P4 to close the filter chamber 319. When the air is discharged from the cyclone chamber 301, the air is flowed in a direction of pivoting the cover 340 to the third position P3. In order to prevent the cover 340 from pivoting to the third position P3 due to the air discharged from the cyclone chamber 301 during the driving of the suction motor M, the cyclone dust-collecting device 300 comprises a locking device. As shown in FIGS. 1 and 2, as the locking device, a first connection member 385 and a second connection member 386 are provided on the cyclone head 310 and the cover 340, respectively. The first and the second connection members 385 and 386 are elastically hooked into each other. The cyclone dust-collecting device 300 further comprises an elastic member 348 (see FIG. 5) for elastically pressing the cover 340 towards the third position P3. Accordingly, if the first and the second connection members 385 and 386 are released from their connections, the cover 340 automatically pivots due to the elastic member 348. Accordingly, since the filter chamber 319 is easily opened and closed, it is easy to maintain or repair the filter chamber 319. Referring to FIG. 5, when the cover 340 pivots to the fourth position P4, a lower end of the cover 340 and the upper end 318b (see FIG. 3) of the cyclone head 310, which face to each other, has a gap therebetween with a predetermined angle θ. The upper side of the gap downwardly inclines away from the pivotal axis 349. This is to prevent the lower end of the cover 340 adjacent to the pivotal axis 349 from contacting the upper end 318b of the cyclone head 310 when the cover 340 is opened. Accordingly, the cover 340 is smoothly opened. In this embodiment, the lower end of the cover 340 downwardly inclines toward a free end of the cover 340 and forms an inclination angle 5°.

An air discharge port 350 is formed on an outer surface of the cyclone dust-collecting device 300 and exposed to the outside from the cleaner body 200. As shown in FIG. 2, the air discharge port 350 fluidly communicates with the cyclone chamber 301 via the filter member 319 and the outlet 316. Therefore, the air discharged from the cyclone dust-collecting device 300 does not flow back to the cleaner body 200. Accordingly, no extra discharge channel is required to connect the cyclone dust-collecting device 300 and the cleaner body 200. In this embodiment, the air discharge port 350 is disposed on the upper end of the cyclone dust-collecting device 300, and more specifically, penetratingly formed through an upper and center portion of the cover 340. When the air is discharged through the air discharge port 350, the air is not directed to a cleaning surface or a user. Therefore, a cleaning efficiency increases and a user rarely feels unpleasant. The cyclone dust-collecting device 300 comprises a discharge cover 360 pivotably connected to the pivotal axis 369 adjacent to the air discharge port 350 such that the discharge cover covers the air discharge port 350 when the suction motor M stops its operation. The discharge cover 360 prevents foreign substances from entering the cyclone dust-collecting device 300 when the cleaner body 200 is not driven. The discharge cover 360 is pivoted to a first position P1 due to the air advancing to the air discharge port 350 such that the air discharge port 350 is opened. If the cleaner body 200 is not driven, the discharge cover 360 is pivoted to a second position P2 and thereby covers the air discharge port 350. Various methods can be used to recover the discharge cover 360. For example, an extra elastic member is used. However, in this embodiment, the discharge cover 360 is automatically closed due to a self-weight. In this case, the first position P1 is set to a position where the discharge cover 360 is closable at any time that the suction motor M is not driven. For this, the discharge cover 360 has a locking protrusion 364 (see FIG. 2) protruding from a free end thereof such that the locking protrusion 364 contacts an inside edge of the air discharge port 350 when the discharge cover 360 is pivoted to the first position P1. When the suction motor M is driven, the locking protrusion 364 prevents the discharge cover 360 from pivoting further away from an allowable position where the discharge cover 360 is recovered due the self-weight. It is preferable that the discharge cover 360 is not pivoted to the first position P1 when the suction motor M is not driven. For this, an upper surface of the cover 340 is downwardly inclined toward a front end of the discharge cover 360. The discharge cover 360 comprises an upper wall 361 and a sidewall 363 such that the air is discharged through the discharge opening 350 towards the front of the cleaner body 200. Since the air discharged from the vacuum cleaner 100 is not directed to the user, unpleasantness the user may have can be reduced.

Operation of the vacuum cleaner according to the present invention will now be described with reference to FIG. 2.

When the suction motor M is driven, dirt D-laden air is drawn in through the dirt suction port 215. The drawn-in air flows into the cyclone dust-collecting device 300 via the suction motor M, the suction pipe 250 and the inlet 311 in sequence. The air is guided by the curved portion 317 of the partition 315 and thus downwardly swirls along the inner circumference of the cyclone chamber 301. While the drawn-in air swirls, the dirt D is separated from the drawn-in air by a centrifugal force, and the separated dirt D is collected on a bottom of the dirt receptacle 330. The air separated from the dirt D in the cyclone chamber 301 passes the grill assembly 380, thereby being filtered firstly. The filtered art flows into the filter chamber 319 through the outlet 316. The air passes the filter member 379, thereby being finally filtered. The cleaned air is discharged from the cyclone dust-collecting device 300 while pivoting the discharge cover 360 to the first position P1.

According to the present invention, the suction motor M is disposed on the air channel connecting the dirt suction port 215 and the cyclone dust-collecting device 300, and the air discharged from the cleaner body 200 is separated by the cyclone dust-collecting device 300 and then discharged to the outside. Accordingly, since a discharge passage connecting the outlet 316 of the cyclone chamber 301 and the cleaner body 200 can be omitted, a structure of the vacuum cleaner becomes simplified. The maintenance or repair of the vacuum cleaner is easy to do and a manufacturing cost can be reduced.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A vacuum cleaner comprising:
   a cleaner body having a suction port assembly to draw in dirt-laden air from a cleaning surface and a suction pipe fluidly communicating with the suction port assembly; and
   a cyclone dust-collecting device having a cyclone chamber to centrifugally separate the air drawn in through the suction pipe, and an air discharge port to discharge an cleaned air which is separated from the dirt in the cyclone chamber, wherein the cyclone dust-collecting device comprises a discharge cover pivoting between a first position and a second position, the first position to open the air discharge port, the second position to cover the air discharge port, and
   wherein the discharge cover is pivoted to the first position by the air discharged through the air discharge port and pivoted back to the second position by a self-weight.

2. The vacuum cleaner as claimed in claim 1, wherein the cleaner body comprises a motor disposed on a suction passage connecting the suction port assembly and the cyclone dust-collecting device.

3. The vacuum cleaner as claimed in claim 2, wherein the discharge cover comprises a protrusion protruding therefrom, the protrusion contacting an inside edge of the air discharge port when the discharge cover is pivoted to the first position by the discharged air and thereby restricting a pivotal movement of the discharge cover, and
   wherein the first position is set to an allowable position such that the discharge cover is recovered to the second position by the self-weight when the motor is not driven.

4. The vacuum cleaner as claimed in claim 1, wherein the cyclone dust-collecting device comprises:
   a cyclone head disposed in the cleaner body and connected to the suction pipe;
   a dirt receptacle connected with the cyclone head and thereby forming the cyclone chamber; and
   a cover pivotably disposed at an open upper end of the cyclone head and opening and closing the upper end of the cyclone head,
   wherein the air discharge port and the discharge cover are disposed on the cover.

5. The vacuum cleaner as claimed in claim 4, wherein the discharge cover is inclined such that a free end of the discharge cover is positioned under a pivotal axis of the discharge cover when the discharge cover is positioned at the second position.

6. The vacuum cleaner as claimed in claim 1, wherein the cyclone dust-collecting device comprises:
   a filter chamber disposed in an air passage connecting an outlet of the cyclone chamber and the air discharge port, an upper end of the filter chamber being opened and closed by the cover;
   a cylindrical filter case removably mounted in the filter chamber and having an upper wall; and
   a filter member disposed inside the filter case, and
   wherein the filter case comprises a plurality of perforations formed on the upper wall of the filter case, for guiding the air passing through the filter member toward the air discharge port, and a holding recess disposed on the upper wall of the filter case away from the perforations, the holding recess enabling a user to insert his/her fingers thereto to hold the filter case.

7. The vacuum cleaner as claimed in claim 6, wherein the air discharge port is penetratingly formed on the cover to fluidly communicate with the filter chamber.

8. The vacuum cleaner as claimed in claim 1, wherein the cyclone dust collecting device comprises:
   a cyclone head disposed on the cleaner body and having an open upper end to fluidly communicate with the suction pipe;
   a dirt receptacle removably connected with a lower end of the cyclone head and forming the cyclone chamber fluidly communicating with an upper end of the cyclone head and the suction pipe; and
   a cover pivotably disposed at an upper end of the cyclone head to open and close the open upper end of the cyclone head, and
   wherein a lower end of the cover and an upper end of the cyclone head, which contact each other when the cover is closed, downwardly incline away from a pivotal axis of the cover.

9. The vacuum cleaner as claimed in claim 8, wherein the cyclone dust-collecting device comprises:
   a partition disposed inside the cyclone head to cover an upper portion of the cyclone chamber, an outlet of the cyclone chamber being penetratingly formed through the partition;
   a filter chamber disposed on an upper portion of the partition and being opened and closed by the cover;
   a cylindrical filter case removably mounted in the filter chamber and having an inner space covered by the upper wall; and
   a filter member disposed in an inner space of the filter case, and
   wherein the filter case comprises a plurality of perforations formed on an upper wall of the filter case and guiding the air passing through the filter member toward the air discharge port, and a holding recess disposed on the upper wall of the filter case away from the perforations, the holding recess enabling a user to insert his/her fingers thereto to hold the filter case.

10. The vacuum cleaner as claimed in claim 9, wherein the air discharge port is penetratingly formed through the cover.

11. The vacuum cleaner as claimed in claim 8, wherein the cyclone dust-collecting device comprises:

a locking device having connection members respectively provided on the cover and the cyclone head, the connection members being selectively engaged with each other when the cover is closed; and an elastic member to elastically pressing the cover to open the cyclone head when the locking device is unlocked.

12. The vacuum cleaner as claimed in claim 1, wherein the cyclone dust-collecting device comprises:

a cyclone head mounted in the cleaner body and having an inlet fluidly communicating with the suction pipe to guide the air drawn in through the suction pipe toward the center of the cyclone chamber;

a dirt receptacle removably connected with a lower end of the cyclone head and thereby forming the cyclone chamber; and a guide member disposed at the cyclone head to cover a downstream portion of the inlet along the air suction passage, the guide member guiding the air drawn into the cyclone chamber through the inlet in a tangential direction with respect to an inner circumference of the cyclone chamber.

13. The vacuum cleaner as claimed in claim 12, wherein the cyclone dust-collecting device comprises a partition covering the upper portion of the cyclone chamber, and the guide member has a curved portion formed by curving a part of the partition upwardly.

14. The vacuum cleaner as claimed in claim 13, wherein the curved portion downwardly inclines along an advancing direction of the drawn-in air.

15. The vacuum cleaner as claimed in claim 12, further comprising a cover to open and close an upper end of the cyclone dust-collecting device which is connected with an outlet of the cyclone chamber, wherein the air discharge port is penetratingly formed through the cover.

16. A cyclone dust-collecting device comprising:

a cyclone head disposed in a cleaner body to connect with a suction pipe, air drawn in from a cleaning surface through a dirt suction port of the cleaner body flowing into the cyclone head through the suction pipe;

a dirt receptacle removably connected with the cyclone head and thereby forming a cyclone chamber to centrifugally separate the air drawn in through the suction pipe;

an air discharge port penetratingly formed through an outer circumference of the cyclone head exposed to the outside of the cleaner body to discharge the air discharged from the cyclone chamber to the outside; and a discharge cover pivoting between a first position to open the air discharge port and a second position to close the air discharge port, wherein the discharge cover is pivoted to the first position by the air discharged from the air discharge port when the motor is driven.

17. A vacuum cleaner comprising:

a cleaner body having a suction port assembly and a suction pipe;

a cyclone head disposed in the cleaner body to connect with the suction pipe a dirt receptacle connected with the cyclone head to centrifugally separate the air drawn in through the suction pipe;

a motor disposed in the cleaner body to be located in an air passage between the cyclone chamber and the suction port assembly, for generating a suction force at the suction port assembly during a driving operation and forcedly conveying the air drawn in through the suction port assembly to the cyclone chamber;

an air discharge port penetratingly formed through an outer circumference of the cyclone head exposed to the outside of the cleaner body, for discharging a cleaned air which is centrifugally separated from dirt in the cyclone chamber to the outside; and a discharge cover disposed at the cyclone head to open and close the air discharge port, wherein the discharge cover is pivoted to open the air discharge port by the air discharged when the motor is driven, and is pivoted to close the air discharge port by a self-weight when the motor is not driven.

* * * * *